US011569505B2

United States Patent
Cao et al.

(10) Patent No.: US 11,569,505 B2
(45) Date of Patent: Jan. 31, 2023

(54) CATHODE MATERIAL, AND PREPARATION METHOD AND APPLICATION THEREOF

(71) Applicants: CALB Technology Co., Ltd., Jiangsu (CN); CALB Co., Ltd., Jiangsu (CN)

(72) Inventors: Kai Cao, Changzhou (CN); Zhimin Wang, Luoyang (CN); Ning Wang, Changzhou (CN); Xuyi Shan, Luoyang (CN)

(73) Assignees: CALB Technology Co., Ltd., Jiangsu (CN); CALB Co., Ltd., Jiangsu (CN)

( * ) Notice: Subject to any disclaimer, the term of this patent is extended or adjusted under 35 U.S.C. 154(b) by 231 days.

(21) Appl. No.: 17/010,851

(22) Filed: Sep. 3, 2020

(65) Prior Publication Data
US 2021/0296644 A1 Sep. 23, 2021

(30) Foreign Application Priority Data
Mar. 19, 2020 (CN) .......................... 202010194573.8

(51) Int. Cl.
*H01B 1/08* (2006.01)
*H01M 4/525* (2010.01)
(Continued)

(52) U.S. Cl.
CPC ............ *H01M 4/525* (2013.01); *C01G 53/50* (2013.01); *H01B 1/08* (2013.01); *H01G 11/46* (2013.01); *H01G 11/50* (2013.01); *H01G 11/86* (2013.01); *H01M 4/366* (2013.01); *H01M 4/505* (2013.01); *H01M 4/62* (2013.01); *H01M 10/0525* (2013.01); *C01P 2002/52* (2013.01); *C01P 2002/72* (2013.01); *C01P 2002/88* (2013.01);
(Continued)

(58) Field of Classification Search
CPC ............ H01B 1/00; H01B 1/08; G01G 53/50; H01M 4/0471; H01M 4/525; H01M 4/366; H01M 4/505; H01G 11/46; H01G 11/86
See application file for complete search history.

(56) References Cited

U.S. PATENT DOCUMENTS 10,236,508 B2 * 3/2019 Ahn ..................... C01G 53/006
10,290,861 B2 5/2019 Choi et al.
(Continued)

FOREIGN PATENT DOCUMENTS

| CN | 104600283 | 5/2015 |
| CN | 104966833 | 10/2015 |

(Continued)

OTHER PUBLICATIONS

Shen et al "Kinetics and structural changes of li-rich layered oxide 0.5Li2MnO3-0.5LiNi0.292Co0.375Mn0.33O2 material . . . ", ACS Appl. Mater. Interfaces 2014, 6, 13271-13279.*
(Continued)

*Primary Examiner* — Mark Kopec
(74) *Attorney, Agent, or Firm* — JCIP Global Inc.

(57) ABSTRACT

A cathode material, containing a crystal with a superlattice structure, is provided. A chemical formula of the crystal is $xLi_2MO_3 \cdot (1-x)LiNi_aCo_bMn_{(1-a-b)}O_2$, where $0<x\leq0.1$, $0.8\leq a<1$, $b\leq0.1$, and M is selected from one or more of Mn, Co, and Ni. A preparation method of the cathode material and a battery or a capacitor containing the cathode material are also provided.

11 Claims, 4 Drawing Sheets

(51) Int. Cl.
  *C01G 53/00* (2006.01)
  *H01G 11/46* (2013.01)
  *H01G 11/50* (2013.01)
  *H01G 11/86* (2013.01)
  *H01M 4/36* (2006.01)
  *H01M 4/505* (2010.01)
  *H01M 4/62* (2006.01)
  *H01M 10/0525* (2010.01)
  *H01M 4/02* (2006.01)

(52) U.S. Cl.
  CPC ...... *C01P 2004/03* (2013.01); *C01P 2004/80* (2013.01); *C01P 2006/40* (2013.01); *H01M 2004/028* (2013.01)

(56) References Cited

U.S. PATENT DOCUMENTS

| | | | |
|---|---|---|---|
| 2011/0052981 A1 | 3/2011 | Lopez et al. | |
| 2013/0252107 A1* | 9/2013 | Lee .................. | H01M 10/0525 429/223 |
| 2015/0357641 A1 | 12/2015 | Sugie et al. | |
| 2019/0341648 A1* | 11/2019 | Wu ..................... | H01G 11/28 |

FOREIGN PATENT DOCUMENTS

| | | |
|---|---|---|
| CN | 107665988 | 2/2018 |
| CN | 108483516 | 9/2018 |
| EP | 3163656 | 5/2017 |

OTHER PUBLICATIONS

Saroha et al "Electrochemical performances of Li-rich layered-layered Li2MnO3—LiMnO2 solid solutions as cathode material for lithium-ion batteries", Journal of Alloys and Compounds 696 (2017) 580-589.*

Shojan et al "High energy xLi2MnO3-(1-x)LiNi2/3Co1/6Mn1/6O2 composite cathode for advanced Li-ion batteries", Journal of Power Sources 274 (2015) 440-450.*

Mehmet Nurullah Ates et al., "A high rate Li-rich layered MNC cathode material for lithium-ion batteries," RSC Advances,vol. 5, Issue 35, Jan. 2015, pp. 27375-27386.

"Search Report of Europe Counterpart Application", dated Mar. 23, 2021, p. 1-p. 7.

"Office Action of China Counterpart Application", dated Nov. 26, 2020, p. 1-p. 10, (No English translation).

Office Action of China Counterpart Application, with English translation thereof, dated Jan. 18, 2022, pp. 1-10.

"Office Action of China Counterpart Application" with English translation thereof, dated Jul. 13, 2021, p. 1-p. 9.

* cited by examiner

CATHODE MATERIAL, AND PREPARATION METHOD AND APPLICATION THEREOF

CROSS-REFERENCE TO RELATED APPLICATION

This application claims the priority benefit of China application serial no. 202010194573.8, filed on Mar. 19, 2020. The entirety of the above-mentioned patent application is hereby incorporated by reference herein and made a part of this specification.

BACKGROUND

Technical Field

The disclosure relates to the field of chemical power supply, and particularly relates to a cathode material, and a preparation method and an application thereof.

Description of Related Art

With the increase of nickel content, the surface state of the high-nickel NCM cathode material is abnormally active. During the charging and discharging process, the high-nickel material reacts with electrolyte to produce a large amount of oxygen, thereby affecting the safety performance of the high-nickel material. At the same time, the increase in nickel content will also increase the degree of Li/Ni mixing. During the deintercalation process of lithium ions, the crystal structure is easily destroyed and the structural stability is reduced, thereby leading to a reduction in the cycle life of the high-nickel material. The two main defects limit the further application of the high-nickel material.

At present, high-nickel materials mainly rely on tetravalent Mn ions for stabilization. However, with the increase of nickel content, the framework support relying only on tetravalent Mn ions can no longer achieve the stability requirement of high-nickel materials under high voltage in the current battery system.

SUMMARY

The disclosure provides a cathode material and a preparation method of the cathode material, and a lithium-ion battery or capacitor containing the cathode material.

An aspect of the disclosure provides a cathode material. The cathode material contains a crystal with a superlattice structure. The chemical formula of the crystal is $xLi_2MO_3 \cdot (1-x)LiNi_aCo_bMn_{(1-a-b)}O_2$, where $0<x\le0.1$, $0.8\le a<1$, $b\le0.1$, and M is selected from one or more of Mn, Co, and Ni.

Another aspect of the disclosure provides a preparation method of the cathode material. The preparation method includes the following steps. The pH value of a solution containing nickel ions, manganese ions, and cobalt ions is adjusted to 10-12 under stirring conditions. The solution is aged at 50-90° C. for 5-12 h after the reaction is completed, and then the separating step, the washing step, and the drying step are performed to obtain a precursor. A lithium source compound and the obtained precursor are evenly mixed, and sintered at 600-1000° C. for 6-15 h.

Another aspect of the disclosure provides a lithium-ion battery or capacitor containing the cathode material.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

To make the aforementioned and other features of the disclosure more comprehensible, several embodiments accompanied with drawings are described in detail as follows.

DETAILED DESCRIPTION OF DISCLOSED EMBODIMENTS

Figure 1:
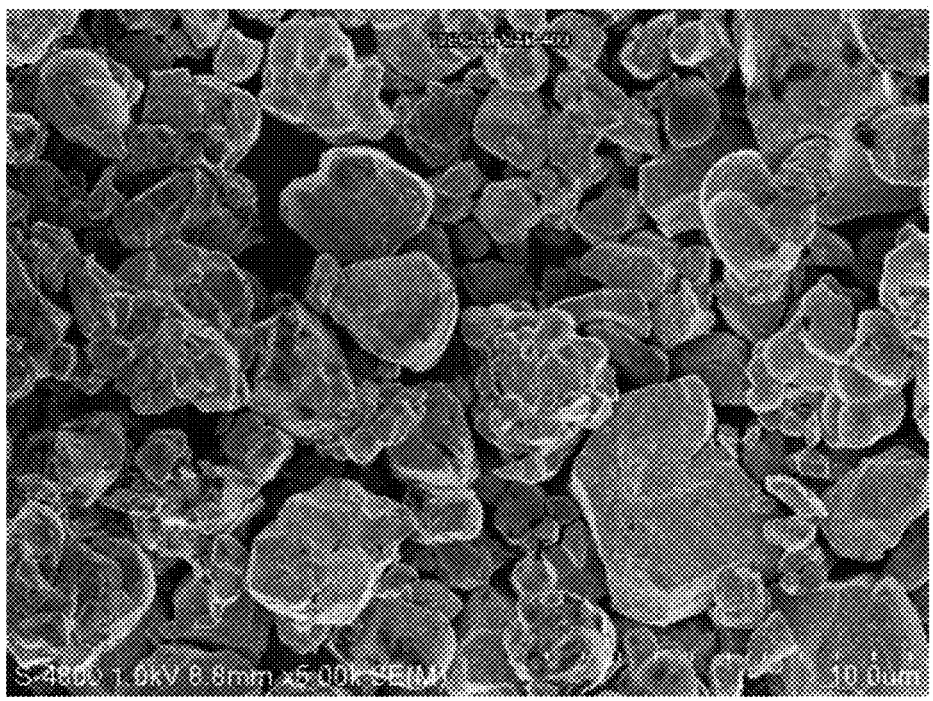
FIG. 1 is a scanning electron micrograph image of a cathode material obtained in Embodiment 1.

The disclosure will be described in detail below in conjunction with specific embodiments.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

A cathode material of the disclosure contains a crystal with a superlattice structure. The chemical formula of the crystal is $xLi_2MO_3 \cdot (1-x)LiNi_aCo_bMn_{(1-a-b)}O_2$, where $0<x\le0.1$, $0.8\le a<1$, $b\le0.1$, and M is selected from one or more of Mn, Co, and Ni. The lithium-rich phase $Li_2MO_3$ is a layered material with a very stable crystal structure. The molar concentration of lithium-rich phase $Li_2MO_3$ in the material is greater than 0 to less than or equal to 10%, which may be selected as any value within the range, such as 1%, 2%, 3%, 4%, 5%, 6%, 7%, 8%, 9%, etc. A small amount of lithium-rich phase may perform nanometer-scale doping on the high-nickel material $LiNi_aCo_bMn_{(1-a-b)}O_2$ at the atomic scale. The synergistic effect may enable the crystal structure framework of the high-nickel material to be more stable while reducing the degree of Li/Ni mixing to improve the structural stability of the nickel-based material. In addition, the lithium-rich phase material has a stable surface structure, and the nickel-based lithium-rich cathode material formed by in situ bonding the lithium-rich phase material with the high-nickel material can stabilize the surface state of the high-nickel material, reduce the risk factor of high-nickel ternary, and improve the safety performance of the high-nickel material.

In an exemplary embodiment, the lithium-rich phase $Li_2MO_3$ is $Li_2MnO_3$.

In an exemplary embodiment, the crystal may also include a dope element. The chemical formula of the crystal including the dope element is $xLi_2MO_3 \cdot (1-x)LiNi_a Co_b Mn_{(1-a-b-c)}M1_cO_2$, where $c \leq 0.03$. A dope element M1 may be any suitable dope element, and in an exemplary embodiment, may be one or more selected from transition metal elements such as Zr, Ti, Al, Mg, Y, etc.

In an exemplary embodiment, a coating layer exists outside the crystal. The specific type of material involved in the coating layer is not particularly limited, and may be selected according to requirements. In an exemplary embodiment, the coating layer may include one or more of oxide, fluoride, phosphate, and polymer. The content of the coating layer may be any suitable content, which may, for example, be 0.03-1% of the total weight of the entire material before coating.

The preparation of the cathode material may include the following steps: a precursor preparation step and a sintering step. First, a precursor containing Ni, Co, and Mn is formed. Then, the precursor and a lithium source compound are mixed and sintered to obtain the cathode material. Specifically, the preparation method of the cathode material includes the following steps. The pH value of a solution containing nickel ions, manganese ions, and cobalt ions is adjusted to 10-12 under stirring conditions. The solution is aged at 50-90° C. for 5-12 h after the reaction is completed, and then the separating step, the washing step, and the drying step are performed to obtain the precursor. Then, the sintering step is performed. The lithium source compound and the obtained precursor are evenly mixed, and sintered at 600-1000° C. for 6-15 h.

In an exemplary embodiment, the precursor may be carbonate or hydroxide.

In an exemplary embodiment, the lithium source compound may be one or more of $LiOH \cdot H_2O$, $Li_2CO_3$, $LiNO_3$, and $CH_3COOLi \cdot 2H_2O$. The mixing amount of the lithium source compound is 1.05-1.2 times the theoretical chemical dose.

In an exemplary embodiment, bulk doping may also be performed in the sintering step, that is, the compound containing the dope element is evenly mixed with the lithium source compound and the precursor for sintering. The dope element is selected from one or more of Zr, Ti, Al, Mg, and Y.

In an exemplary embodiment, liquid-phase coating may be performed on the sintered material to form the coating layer. The coating layer includes one or more of oxide, fluoride, phosphate, and polymer.

The cathode material of the disclosure is suitable for a lithium-ion battery or supercapacitor.

The cathode material contains a crystal with a layer-layer superlattice structure, which intersperses another layered structure on the basis of a conventional high-nickel ternary material in a layered structure to improve the structural stability of the product using two different layered structures interlocking with each other. The cathode material dilutes the nickel content in the product to a certain extent due to the addition of a lithium-rich phase ($Li_2MO_3$). The reduction of nickel content can effectively improve the gas production of the battery. Therefore, the present application can improve the safety performance of the battery from the two aspects of reducing gas production and stabilizing the cathode structure.

The present application is further described in the following through specific embodiments. However, the embodiments are only exemplary and do not limit the protection scope of the disclosure.

In the following embodiments, the reagent, material, and instrument used are commercially available unless otherwise specified.

Embodiment 1

A certain volume of nickel sulfate, cobalt, manganese solution, and sodium hydroxide solution in excess of 2% mol are simultaneously dripped into a mother solution through a peristaltic pump at a feed rate of 580 $\mu L \cdot min^{-1}$. The molar ratio of nickel, cobalt, and manganese is 72:9:19. The reactive temperature of the material is 50° C. and the pH is controlled at 10 while an overhead stirring rod is vigorously stirred at a rotational speed of 400 $rmp \cdot min^{-1}$, and nitrogen protection is added during the reaction. After aging for 10 h, the obtained hydroxide precursor is first filtered by suction, then washed twice in a certain volume of distilled water, and finally vacuum-dried at 100° C. for 6 h to obtain a dried precursor. The precursor and a certain molar ratio of LiOH are fully ground and mixed, then pre-calcined at 500° C. for 5 h in a muffle furnace at a heating rate of 5° C. $min^{-1}$, and then calcined at 800° C. for 12 h to obtain a lithium-rich nickel-based cathode material $0.1Li_2MnO_3 \cdot 0.9LiNi_{0.8}Co_{0.1}Mn_{0.1}O_2$.

FIG. 1 shows a scanning electron microscope (SEM) image of the lithium-rich nickel-based cathode material obtained in the embodiment. It can be seen from the SEM image that the lithium-rich nickel-based cathode material comprises micron-sized monocrystalline particles. The blending of large and small particles is conducive to improving the tap and compaction density of the material, which is suitable for practical application.

Figure 2:
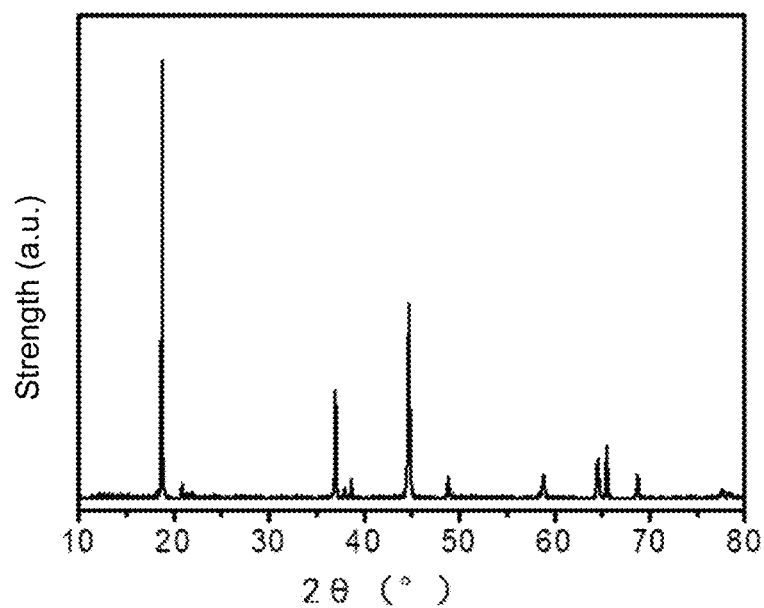
FIG. 2 is an X-ray diffraction (XRD) pattern of the cathode material obtained in Embodiment 1.

FIG. 2 shows an X-ray diffraction (XRD) spectrum of the lithium-rich nickel-based cathode material obtained in the embodiment. It can be seen from the drawing that most of the diffraction peaks of the material belong to the α-$NaFeO_2$ structure with a space cluster of R-3m, and a superlattice diffraction peak is produced at 20° to 23°, which indicates that the cathode material obtained in the embodiment contains superlattice structure.

Figure 3:
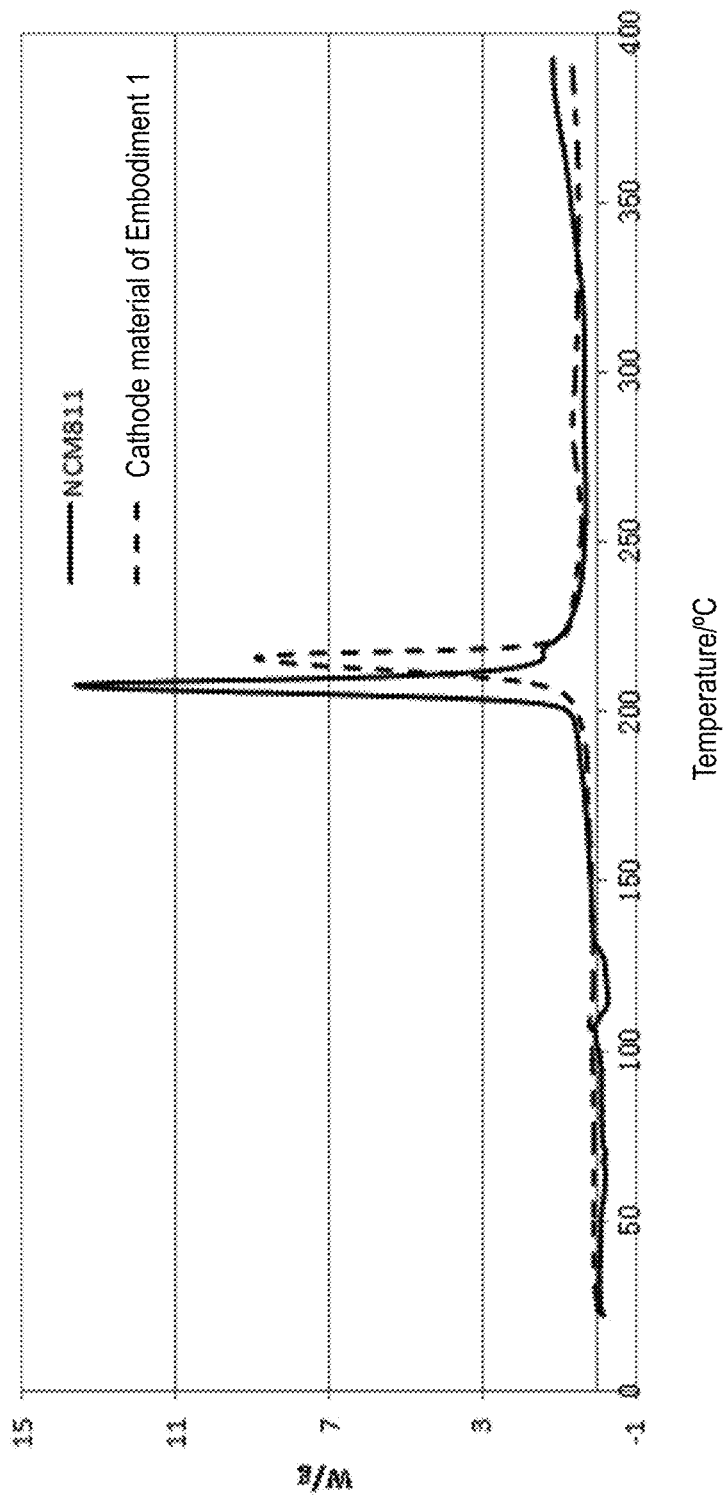
FIG. 3 is a differential scanning calorimetry (DSC) curve of the cathode material obtained in Embodiment 1 and $LiNi_{0.8}Co_{0.1}Mn_{0.1}O_2$.
Figure 4:
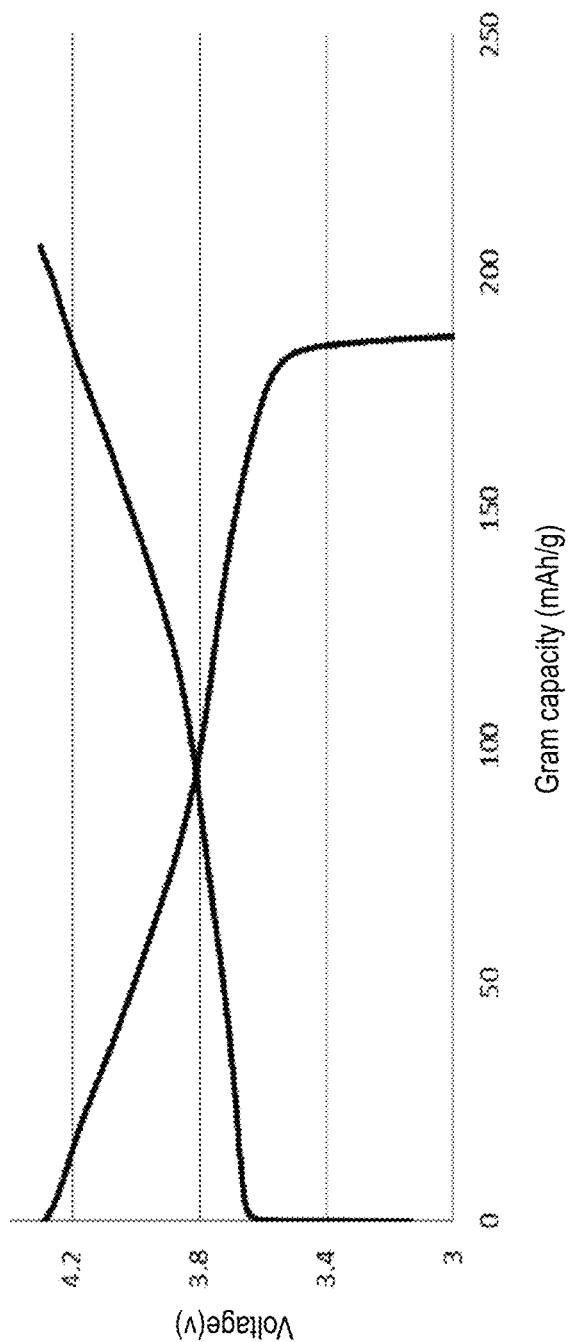
FIG. 4 is a first charge/discharge curve of a battery assembled from the cathode material obtained in Embodiment 1.

FIG. 3 shows a differential scanning calorimetry (DSC) curve of the lithium-rich nickel-based cathode material obtained in the embodiment and the high-nickel $LiNi_{0.8}Co_{0.1}Mn_{0.1}O_2$ (NCM811). It can be seen from the DSC curve that the peak temperature of the lithium-rich nickel-based material obtained in the embodiment is higher than that of NCM811, and the peak strength of the lithium-rich nickel-based material obtained in the embodiment is lower than that of NCM811, which indicates that the material has higher thermal stability than NCM811.

Embodiment 2

A certain volume of nickel acetate, cobalt, manganese solution, and sodium carbonate solution in excess of 3% mol are simultaneously dripped into a mother solution containing sodium carbonate through a peristaltic pump at a feed rate of 1000 $\mu L \cdot min^{-1}$. The molar ratio of nickel, cobalt, and manganese is 76:9.5:14.5. The reactive temperature of the material is 55° C. and pH=11 while an overhead stirring rod is vigorously stirred at a rotational speed of 500 $rmp \cdot min^{-1}$, and argon protection is added during the reaction. The carbonate precursor obtained after aging for 5 h is first filtered by suction, then washed twice in 800 mL of distilled water, and finally vacuum-dried at 120° C. for 8 h to obtain a dried precursor. The obtained precursor and a certain molar ratio of LiOH are fully ground and mixed, then pre-calcined at 500° C. for 5 h in a muffle furnace at a heating rate of 5° C. min$^{-1}$, and then calcined at 600° C. for 10 h to obtain a lithium-rich nickel-based cathode material $0.05Li_2MnO_3$-$0.95LiNi_{0.8}Co_{0.1}Mn_{0.1}O_2$.

Embodiment 3

A certain volume of nickel sulfate, cobalt, manganese solution, and sodium hydroxide solution in excess of 1% mol are simultaneously dripped into a mother solution containing sodium hydroxide through a peristaltic pump at a feed rate of 780 μL·min$^{-1}$. The molar ratio of nickel, cobalt, and manganese is 83.6:6.7:9.7. The reactive temperature of the material is 60° C. and pH=12 while an overhead stirring rod is vigorously stirred at a rotational speed of 600 rmp·min$^{-1}$, and nitrogen protection is added during the reaction. The hydroxide precursor obtained after aging for 8 h is first filtered by suction, then washed twice in 700 mL of distilled water, and finally vacuum-dried at 80° C. for 10 h to obtain a dried precursor. The obtained precursor and a certain molar ratio of $Li_2CO_3$ are fully ground and mixed, then pre-calcined at 500° C. for 5 h in a muffle furnace at a heating rate of 5° C. min$^{-1}$, and then calcined at 1000° C. for 8 h to obtain a lithium-rich nickel-based cathode material $0.05Li_2MnO_3$-$0.95LiNi_{0.88}Co_{0.07}Mn_{0.05}O_2$.

Embodiment 4

A certain amount of nickel sulfate, cobalt, manganese solution, and sodium carbonate solution in excess of 5% mol are simultaneously dripped into a mother solution containing sodium carbonate through a peristaltic pump at a feed rate of 800 μL·min$^{-1}$. The molar ratio of nickel, cobalt, and manganese is 72:19:9. The reactive temperature of the material is 45° C. and pH=11 while an overhead stirring rod is vigorously stirred at a rotational speed of 600 rmp·min$^{-1}$, and nitrogen protection is added during the reaction. The carbonate precursor obtained after aging for 10 h is first filtered by suction, then washed twice in 900 mL of distilled water, and finally vacuum-dried at 100° C. for 8 h to obtain a dried precursor. The obtained precursor and a certain molar ratio of $CH_3COOLi$ are fully ground and mixed, then pre-calcined at 500° C. for 5 h in a muffle furnace at a heating rate of 5° C. min$^{-1}$, and then calcined at 800° C. for 15 h to obtain a lithium-rich nickel-based cathode material $0.1Li_2CoO_3$-$0.9LiNi_{0.8}Co_{0.1}Mn_{0.1}O_2$.

The lithium-rich nickel-based cathode materials obtained in Embodiments 1-4 are made into an electrode sheet and assembled into a button battery. The specific process is as follows. First, the lithium-rich nickel-based cathode material, acetylene black, and PVDF are fully ground and mixed according to a mass ratio of 8:1:1. Then NMP is added to dissolve the mixture, and the mixture is continuously stirred for 6 h. Then, the mixture is spread onto a clean aluminum foil using a blade. After vacuum-drying at 120° C. for 12 h, an electrode sheet with a diameter of 14 mm is punched out using a punching machine. The electrode sheet is assembled into a button half-cell with model 2032 in a Mbraun glove box. A lithium sheet is used as a counter electrode and a reference electrode. The electrolyte is 1 mol of $LiPF_6$ dissolved in ethylene carbonate, dimethyl carbonate, and fluoroethylene carbonate in a weight ratio of 3:5:2. The assembled battery is charge/discharge tested on Shenzhen Neware tester.

FIG. 3 shows a first charge/discharge curve of the lithium-rich nickel-based cathode material obtained in Embodiment 1. It can be obtained from the curve that when the charge/discharge voltage window is 3.0-4.25V and the simultaneous charge/discharge current is ⅓C, the first charge gram capacity and discharge gram capacity are respectively 205.4 mAh·g$^{-1}$ and 186.4 mAh·g$^{-1}$, the first efficiency is 90.75%, which shows good first charge/discharge performance. The first charge/discharge gram capacities and efficiencies of the lithium-rich nickel-based cathode materials obtained in Embodiments 1-4 are shown in Table 1.

TABLE 1

| Cathode material | First charge gram capacity (mAh · g$^{-1}$) | First discharge gram capacity (mAh · g$^{-1}$) | First charge/discharge efficiency (%) |
| --- | --- | --- | --- |
| Embodiment 1 | 205.4 | 186.4 | 90.75 |
| Embodiment 2 | 220.1 | 196.3 | 89.18 |
| Embodiment 3 | 236.3 | 212.8 | 90.07 |
| Embodiment 4 | 210.6 | 192.1 | 91.22 |

It can be seen from Table 1 that the cathode materials of Embodiments 1-4 have better first charge/discharge gram capacities and first charge/discharge efficiencies. In addition, the cathode materials obtained in Embodiments 2-4 also have superlattice structures and have better thermal stability than NCM811 without the superlattice structure.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A cathode material, containing a crystal with a superlattice structure, wherein a chemical formula of the crystal is $0.1Li_2CoO_3·0.9LiNi_{0.8}Co_{0.1}Mo_{0.1}O_2$.

2. The cathode material according to claim 1, wherein a coating layer exists outside the crystal, and the coating layer comprises one or more of oxide, fluoride, phosphate, and polymer.

3. A lithium-ion battery, comprising the cathode material according to claim 2.

4. A capacitor, comprising the cathode material according to claim 2.

5. A preparation method of the cathode material according to claim 1, comprising:

a precursor preparation step comprising adjusting a pH value of a solution containing nickel ions, manganese ions, and cobalt ions to 10-12 under stirring conditions, aging the solution at 50-90° C. for 5-12 h after reaction being completed, and performing a separating step, a washing step, and a drying step to obtain a precursor; and a sintering step comprising evenly mixing a lithium source compound and the obtained precursor and sintering at 600-1000° C. for 6-15 h.

6. The preparation method according to claim 5, wherein the precursor is carbonate or hydroxide.

7. The preparation method according to claim 5, wherein the lithium source compound is one or more of $LiOH \cdot H_2O$, $Li_2CO_3$, $LiNO_3$, and $CH_3COOLi \cdot 2H_2O$, and a mixing amount of the lithium source compound is 1.05-1.2 times a theoretical chemical dose.

8. The preparation method according to claim 5, wherein in the sintering step, a compound containing a dope element is further added to sinter together with the lithium source compound and the precursor, and the dope element is selected from one or more of Zr, Ti, Al, Mg, and Y.

9. The preparation method according to claim 5, further comprising: performing liquid-phase coating on the sintered material to form a coating layer, wherein the coating layer comprises one or more of oxide, fluoride, phosphate, and polymer.

10. A lithium-ion battery, comprising the cathode material according to claim 1.

11. A capacitor, comprising the cathode material according to claim 1.

* * * * *